United States Patent
Szocinski et al.

(10) Patent No.: US 12,502,928 B2
(45) Date of Patent: Dec. 23, 2025

(54) AIR VENT ASSEMBLY WITH PRESSURE RELIEF VALVE

(71) Applicant: GM GLOBAL TECHNOLOGY OPERATIONS LLC, Detroit, MI (US)

(72) Inventors: Roman Szocinski, Clinton Township, MI (US); Steven Jay Leathorn, Fort Gratiot, MI (US); Angel R. Munoz, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 488 days.

(21) Appl. No.: 18/074,111

(22) Filed: Dec. 2, 2022

(65) Prior Publication Data
US 2024/0181842 A1 Jun. 6, 2024

(51) Int. Cl.
*B60H 1/00* (2006.01)
(52) U.S. Cl.
CPC ..... *B60H 1/00835* (2013.01); *B60H 1/00564* (2013.01); *B60H 2001/00728* (2013.01)
(58) Field of Classification Search
CPC ............ B60H 1/00835; B60H 1/00564; B60H 1/00864; B60H 1/247; B60H 1/3407; B60H 1/3414; B60H 1/00485; B60H 2001/00728
See application file for complete search history.

(56) References Cited

U.S. PATENT DOCUMENTS

| 8,029,343 B2 * | 10/2011 | Major | H01M 10/615 62/244 |
| 10,543,736 B2 | 1/2020 | Freeman et al. | |
| 2014/0106658 A1 * | 4/2014 | Freeman | B60H 1/249 29/428 |
| 2014/0196866 A1 * | 7/2014 | Bezzina | B60H 1/00278 165/42 |

FOREIGN PATENT DOCUMENTS

CN 104608592 A 5/2015

OTHER PUBLICATIONS

German Office Action for German Application No. 102023121004.1; dated Aug. 13, 2025; 7 pages.

* cited by examiner

*Primary Examiner* — Allen R. B. Schult
(74) *Attorney, Agent, or Firm* — CANTOR COLBURN LLP

(57) ABSTRACT

A vent assembly of a vehicle includes a vent having a vent opening through which an airflow is directed, and a primary duct operably connected to the vent to convey the airflow toward the vent opening. A pressure relief valve is located along the primary duct. The pressure relief valve is configured to open when a pressure of the airflow in the primary duct exceeds a threshold, to divert a portion of the airflow through the pressure relief valve.

20 Claims, 5 Drawing Sheets

AIR VENT ASSEMBLY WITH PRESSURE RELIEF VALVE

INTRODUCTION

The subject disclosure relates to heating, ventilation and air conditioning of a vehicle. In particular, the present disclosure relates to control of airflow out of vents in the vehicle. Vehicles have multiple air vents in, for example, an instrument panel of the vehicle to distribute conditioned airflow into the passenger compartment of the vehicle. These vents typically use slide levers to move one or more sets of louvers or doors inside the vent to change the side-to-side and/or up-down direction of the airflow. With styling changes to vehicle interiors, the use of slim profile vents is increasing in usage. The use of such slim profile vents, however, may increase a resistance in the system, thus reducing an amount of airflow into the cabin. It is desired to reduce this resistance in order to improve the airflow into the vehicle cabin and quickly condition the airflow.

SUMMARY

In one exemplary embodiment, a vent assembly of a vehicle includes a vent having a vent opening through which an airflow is directed, and a primary duct operably connected to the vent to convey the airflow toward the vent opening. A pressure relief valve is located along the primary duct. The pressure relief valve is configured to open when a pressure of the airflow in the primary duct exceeds a threshold, to divert a portion of the airflow through the pressure relief valve.

In addition to one or more of the features described herein a secondary duct is operably connected to the pressure relief valve to convey the portion of the airflow from the pressure relief valve.

In addition to one or more of the features described herein the secondary duct includes a secondary outlet through which the portion of the airflow is conveyed.

In addition to one or more of the features described herein the pressure relief value includes a valve opening and a valve door extending across the valve opening when the pressure relief valve is in a closed position.

In addition to one or more of the features described herein a biasing member is connected to the valve door to bias the valve door in the closed position.

In addition to one or more of the features described herein the pressure relief valve includes a valve housing having a valve opening, and a flexible valve membrane secured to the valve housing. The valve membrane covers the valve opening when the pressure relief valve is in the closed position, and the flexible membrane uncovers the valve opening when the pressure of the airflow in the primary duct exceeds the threshold.

In another exemplary embodiment, a heating, ventilation and air conditioning (HVAC) system of a vehicle includes an HVAC unit, a primary duct operably connected to the HVAC unit, and a vent operably connected to the HVAC unit and configured to convey an airflow from the HVAC unit into an occupant compartment of the vehicle via the primary duct. A pressure relief valve is located along the primary duct. The pressure relief valve is configured to open when a pressure of the airflow in the primary duct exceeds a threshold, to divert a portion of the airflow through the pressure relief valve.

In addition to one or more of the features described herein a secondary duct is operably connected to the pressure relief valve to convey the portion of the airflow from the pressure relief valve.

In addition to one or more of the features described herein the secondary duct includes a secondary outlet which the portion of the airflow is conveyed.

In addition to one or more of the features described herein the secondary outlet directs the portion of the airflow into the occupant compartment.

In addition to one or more of the features described herein the pressure relief value includes a valve opening and a valve door extending across the valve opening when the pressure relief valve is in a closed position.

In addition to one or more of the features described herein a biasing member is connected to the valve door to bias the valve door in the closed position.

In addition to one or more of the features described herein the pressure relief valve includes a valve housing having a valve opening, and a flexible valve membrane secured to the valve housing. The valve membrane covers the valve opening when the pressure relief valve is in the closed position, and the flexible membrane uncovers the valve opening when the pressure of the airflow in the primary duct exceeds the threshold.

In yet another exemplary embodiment, a vehicle includes a vehicle body defining an occupant compartment inside the vehicle, and a heating, ventilation and air conditioning (HVAC) system. The HVAC system includes an HVAC unit, a primary duct operably connected to the HVAC unit, and a vent operably connected to the HVAC unit and configured to convey an airflow from the HVAC unit into the occupant compartment of the vehicle via the primary duct. A pressure relief valve is located along the primary duct. The pressure relief valve is configured to open when a pressure of the airflow in the primary duct exceeds a threshold, to divert a portion of the airflow through the pressure relief valve.

In addition to one or more of the features described herein a secondary duct is operably connected to the pressure relief valve to convey the portion of the airflow from the pressure relief valve. The secondary duct includes a secondary outlet through which the portion of the airflow is conveyed.

In addition to one or more of the features described herein the secondary outlet directs the portion of the airflow into the occupant compartment.

In addition to one or more of the features described herein the secondary outlet is in an instrument panel of the vehicle.

In addition to one or more of the features described herein the pressure relief value includes a valve opening and a valve door extending across the valve opening when the pressure relief valve is in a closed position.

In addition to one or more of the features described herein a biasing member is connected to the valve door to bias the valve door in the closed position.

In addition to one or more of the features described herein the pressure relief valve includes a valve housing having a valve opening, and a flexible valve membrane secured to the valve housing. The valve membrane covers the valve opening when the pressure relief valve is in a closed position, and the flexible membrane uncovers the valve opening when the pressure of the airflow in the primary duct exceeds the threshold.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
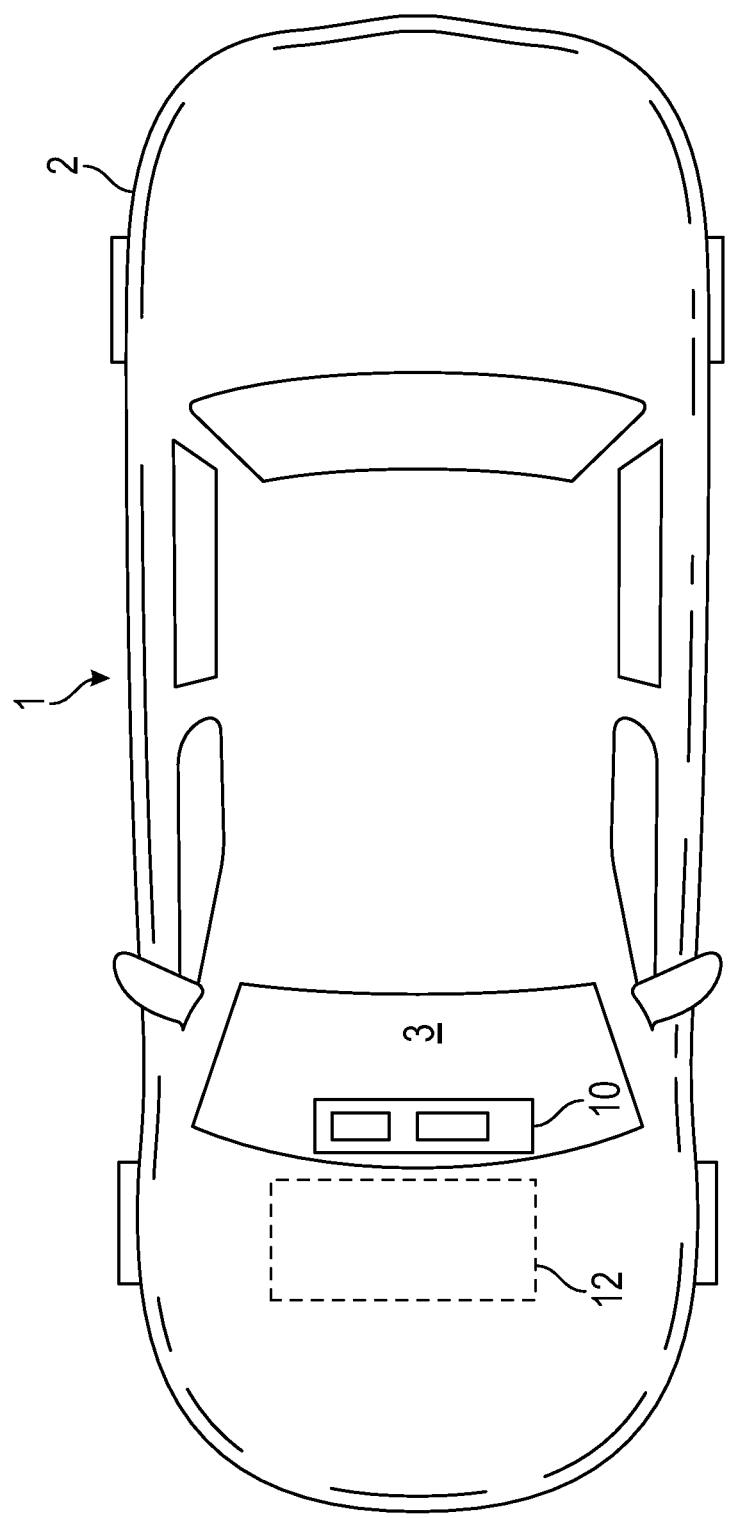
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

Figure 2:
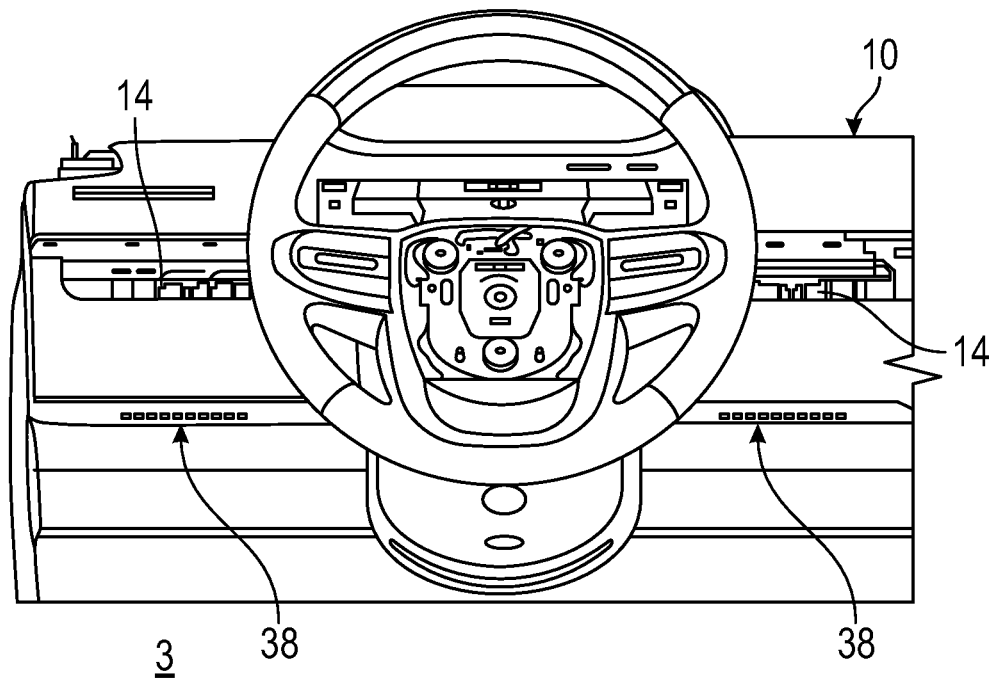
FIG. 2 is a schematic illustration of an embodiment of an instrument panel of a vehicle.

In accordance with an exemplary embodiment, illustrated in FIG. 1 is an embodiment of a vehicle 1. The vehicle 1 includes a vehicle body 2, which defines an occupant compartment 3 in an interior of the vehicle 1. As shown in FIG. 2, the occupant compartment 3 includes an instrument panel 10 extending across the occupant compartment 3. The occupant compartment 3 is conditioned to be heated or cooled via a heating, ventilation and air conditioning (HVAC) system 12 (shown in FIG. 1), with conditioned airflow into the occupant compartment 3 via one or more vent assemblies 14 located in the instrument panel 10. While the vent assemblies 14 are described herein as being located in the instrument panel 10, one skilled in the art will readily appreciate that the vent assemblies 14 may be additionally or alternatively located at other locations such as, for example, doors of the vehicle or a center console of the vehicle.

Figure 3:
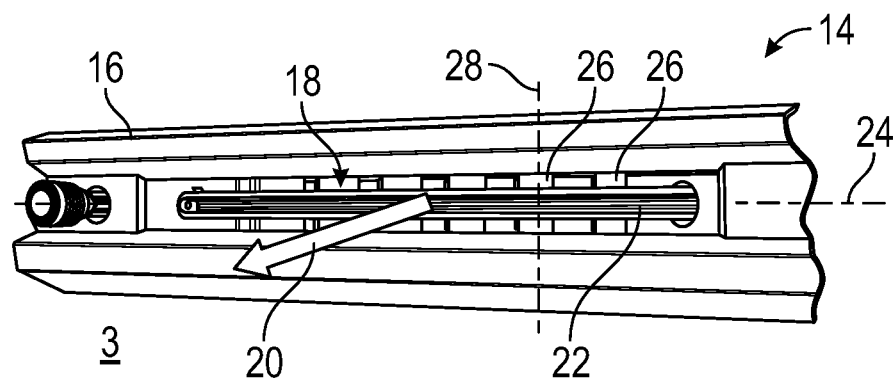
FIG. 3 is a perspective view of an embodiment of a vent assembly of a vehicle.

An embodiment of a vent assembly 14 is illustrated in FIG. 3. The vent assembly 14 includes a bezel 16, which defines a vent opening 18 through which the airflow 20 is directed into the occupant compartment 3. The vent assembly 14 includes a movable primary vane 22 which is rotatable about a primary vane axis 24, and a plurality of secondary vanes 26, which are each rotatable about respective secondary vane axes 28. In some embodiments, the primary vane axis 24 is a horizontal axis, such that rotation of the primary vane 22 about the primary vane axis 24 changes a direction of the airflow 20 in a first, vertical direction with respect to the passenger compartment 3. Further, in some embodiments the secondary vane axis 28 is a vertical axis, such that rotation of the secondary vanes 26 about their secondary vane axes 28 changes the direction of the airflow 20 in a second, horizontal direction. The primary vane 22 and secondary vanes 26 are moved to direct the airflow 20 in a selected or desired direction.

Figure 4:
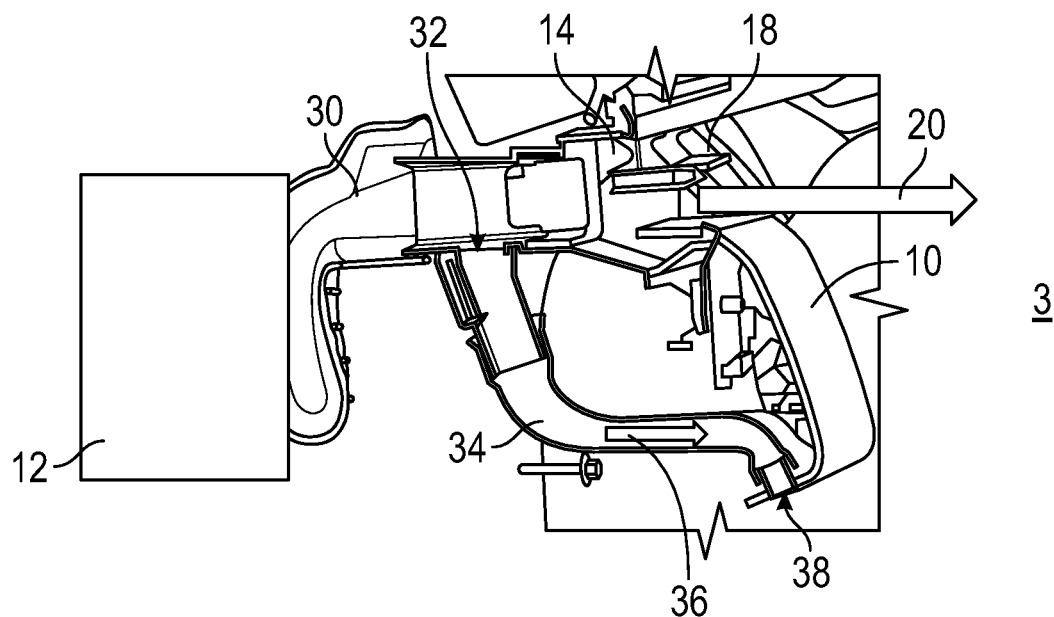
FIG. 4. is a cross-sectional view of an embodiment of a vent assembly including a pressure relief valve.
Figure 5:
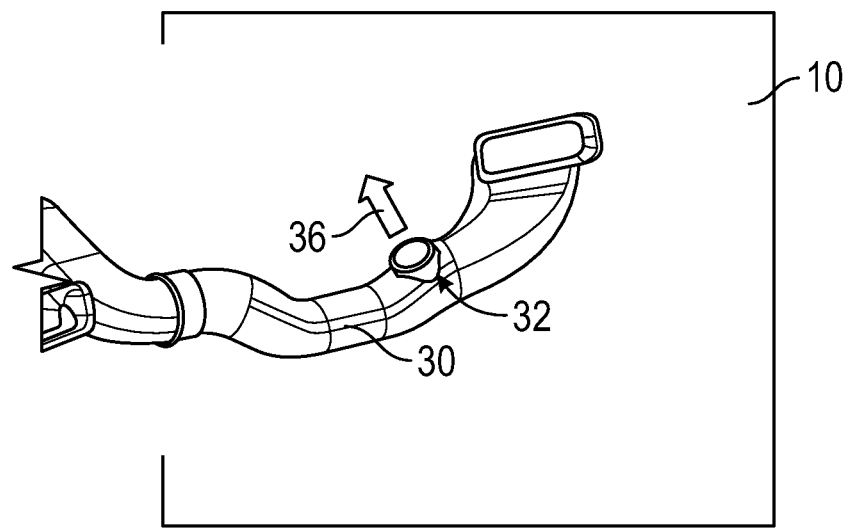
FIG. 5 is a perspective view of an embodiment of a primary duct including a pressure relief valve.

Referring now to FIG. 4, the vent assembly 14 is operably connected to the HVAC system 12 via a primary duct 30, which directs the airflow 20 from the HVAC system 12 through the vent assembly 14. In certain operating conditions, an effective cross-sectional area of the vent opening 18 restricts the airflow 20 from entering the occupant compartment 3 at a desired rate to quickly condition the occupant compartment 3. A pressure relief valve 32 is located along the primary duct 30, which automatically opens when a pressure of the airflow 20 in the primary duct 30 exceeds a threshold. In some embodiments such as shown in FIG. 4, a secondary duct 34 is connected to the pressure relief valve 32. When the pressure relief valve 32 is opened, a portion of the airflow 20 herein referred to as a relief airflow 36 is diverted through the pressure relief valve 32 and into the secondary duct 34. The secondary duct 34 is connected to a secondary outlet 38 into the occupant compartment 3 to direct the relief airflow 36 into the occupant compartment. In some embodiments, the secondary outlet 38 is discretely positioned on the instrument panel 10, such as downward facing as illustrated in FIG. 4 and FIG. 2. This reduces the effect of the secondary outlet 38 on styling of the instrument panel 10, while still providing the additional airflow into the occupant compartment 3. In another embodiment, illustrated in FIG. 5, the relief airflow 36 is not directed directly into the occupant compartment 3 but is vented inside of the instrument panel 10 to relieve the pressure in the primary duct 30.

Figure 6:
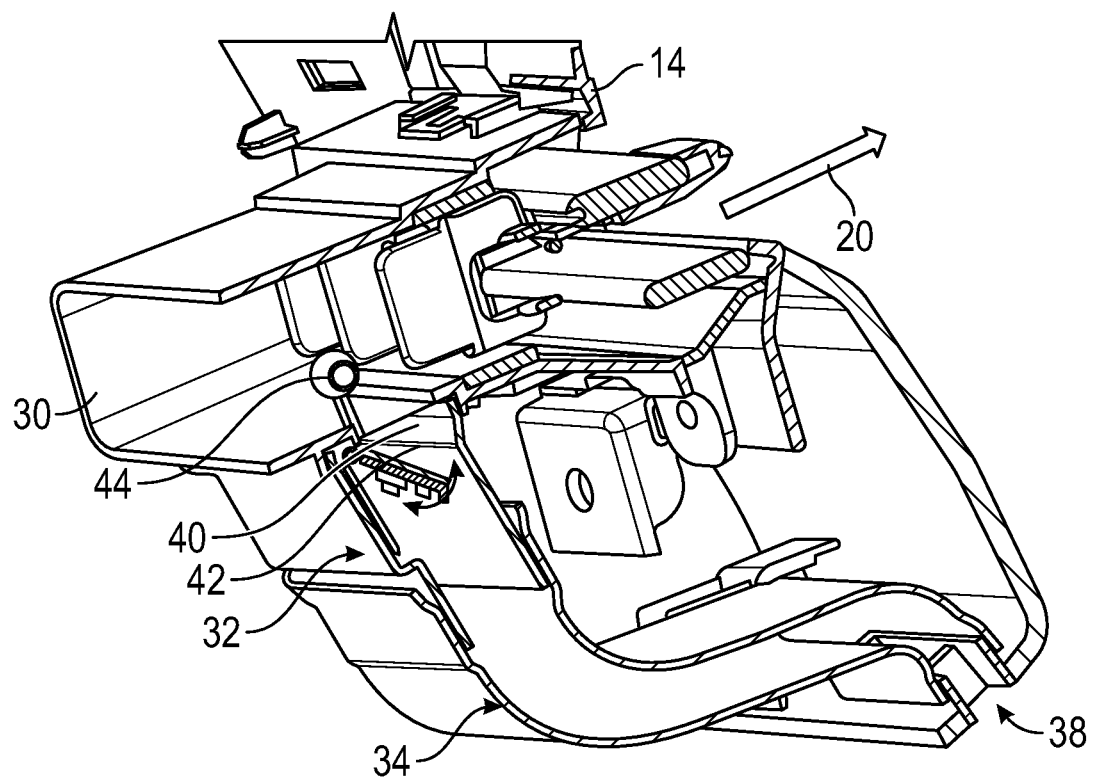
FIG. 6 is another cross-sectional view of an embodiment of a vent assembly including a pressure relief valve.

One embodiment of a pressure relief valve 32 is illustrated in FIG. 6. The pressure relief valve 32 includes a valve door 40 that extends across a valve opening 42 when the valve door 40 is in a closed position. A biasing element, such as a counterweight 44 is connected to the valve door 40 to bias the valve door 40 into the closed position. One skilled in the art will appreciate that the counterweight 44 is merely one example of a biasing element, and that other biasing elements such as springs or the like may be utilized. When the pressure in the primary duct 30 exceeds the threshold, a biasing force of the biasing element is overcome and the valve door 40 is moved to an opened position via the pressure in the primary duct 30.

Figure 7:
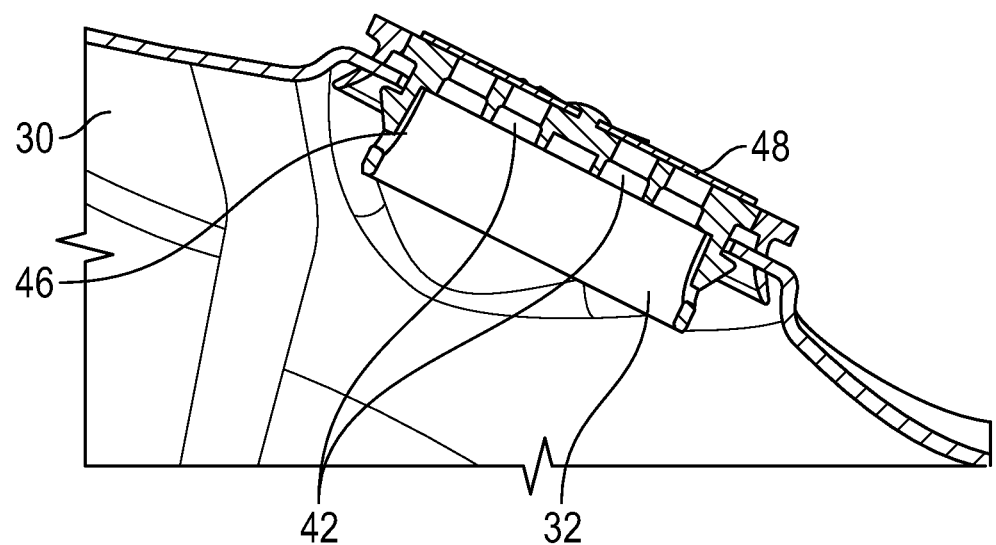
FIG. 7 is a cross-sectional view of an embodiment of a pressure relief valve.
Figure 8:
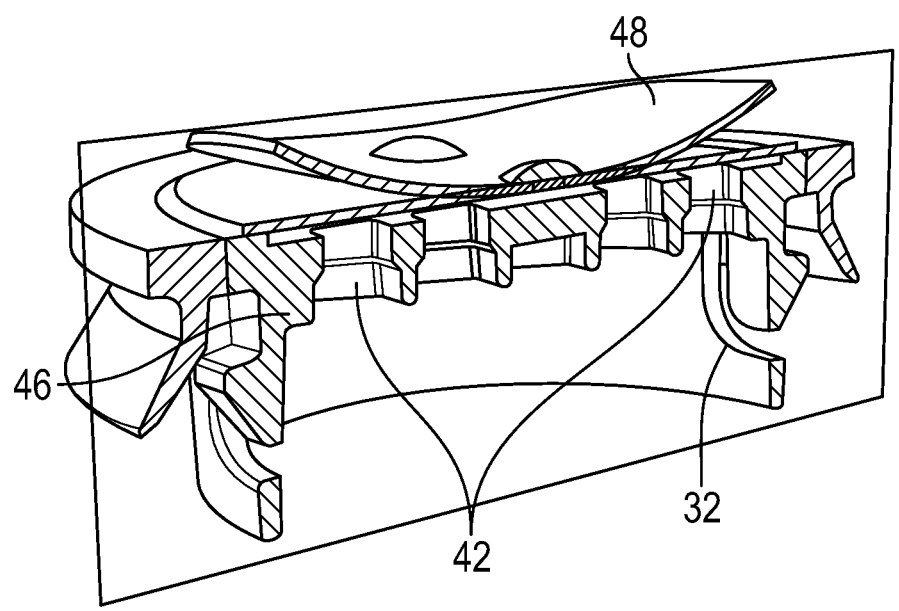
FIG. 8 is another cross-sectional view of an embodiment of a pressure relief valve.

In another embodiment, as illustrated in FIGS. 7 and 8, the pressure relief valve 32 includes a valve housing 46 defining a plurality of valve openings 42. A flexible valve membrane 48 is located over the plurality of valve openings 42 and is secured to the valve housing 46. When in the closed position, such as in FIG. 7, the valve membrane 48 covers the valve openings 42, thus preventing airflow through the plurality of valve openings 42. As shown in FIG. 8, when the pressure in the primary duct 30 exceeds the threshold, the valve membrane 48 flexes such that the plurality of valve openings 42 are uncovered by the valve membrane 48 allowing the relief airflow 36 to flow through the plurality of valve openings 42. The material and configuration of the valve membrane 48 is selected such that the valve membrane 48 is biased to the closed position covering the plurality of valve openings 42 unless the pressure in the primary duct 30 exceeds the threshold, at which point the pressure overcomes the biasing force of the valve membrane 48 allowing the pressure relief valve 32 to be opened, allowing the relief airflow 36 to flow through the plurality of valve openings 42.

The configurations disclosed herein including the pressure relief valve 32 allow for reduction in the airflow resistance in the HVAC system 12 and further allow for introduction of increased airflow into the occupant compartment 3 for faster conditioning of the occupant compartment 3 in some operating conditions, such as those requiring full capacity of the HVAC system 12. The configuration may also reduce air rush noises through the vent assembly 14, and supports the styling objectives of reducing the visible size of vent openings, by placing the secondary outlet 38 in a discreet or hidden location. Further, the pressure relief valve 32 may be placed anywhere along the primary duct 30, and is not visible to the occupant of the vehicle.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A vent assembly of a vehicle comprising:
   a vent having a vent opening through which an airflow is directed;
   a primary duct operably connected to the vent to convey the airflow directly from a heating, ventilation and air conditioning (HVAC) unit toward the vent opening; and
   a pressure relief valve located along the primary duct upstream of the vent, the pressure relief valve configured to open when a pressure of the airflow in the primary duct exceeds a threshold, to divert a portion of the airflow through the pressure relief valve.

2. The vent assembly of claim 1, further comprising a secondary duct operably connected to the pressure relief valve to convey the portion of the airflow from the pressure relief valve.

3. The vent assembly of claim 2, further comprising a secondary outlet of the secondary duct through which the portion of the airflow is conveyed.

4. The vent assembly of claim 1, wherein the pressure relief valve includes a valve opening and a valve door extending across the valve opening when the pressure relief valve is in a closed position.

5. The vent assembly of claim 4, further comprising a biasing member connected to the valve door to bias the valve door in the closed position.

6. The vent assembly of claim 1, wherein the pressure relief valve includes:
   a valve housing having a valve opening; and
   a flexible valve membrane secured to the valve housing;
   wherein the valve membrane covers the valve opening when the pressure relief valve is a the closed position, and the flexible membrane uncovers the valve opening when the pressure of the airflow in the primary duct exceeds the threshold.

7. A heating, ventilation and air conditioning (HVAC) system of a vehicle comprising:
   an HVAC unit;
   a primary duct operably connected to the HVAC unit;
   a vent operably connected to the HVAC unit and configured to convey an airflow directly from the HVAC unit into an occupant compartment of the vehicle via the primary duct; and
   a pressure relief valve located along the primary duct upstream of the vent, the pressure relief valve configured to open when a pressure of the airflow in the primary duct exceeds a threshold, to divert a portion of the airflow through the pressure relief valve.

8. The HVAC system of claim 7, further comprising a secondary duct operably connected to the pressure relief valve to convey the portion of the airflow from the pressure relief valve.

9. The HVAC system of claim 8, further comprising a secondary outlet of the secondary duct through which the portion of the airflow is conveyed.

10. The HVAC system of claim 9, wherein the secondary outlet directs the portion of the airflow into the occupant compartment.

11. The HVAC system of claim 7, wherein the pressure relief valve includes a valve opening and a valve door extending across the valve opening when the pressure relief valve is in a closed position.

12. The HVAC system of claim 11, further comprising a biasing member connected to the valve door to bias the valve door in the closed position.

13. The HVAC system of claim 7, wherein the pressure relief valve includes:
   a valve housing having a valve opening; and
   a flexible valve membrane secured to the valve housing;
   wherein the valve membrane covers valve opening when the pressure relief valve is a the closed position, and the flexible membrane uncovers the valve opening when the pressure of the airflow in the primary duct exceeds the threshold.

14. A vehicle comprising:
   a vehicle body defining an occupant compartment inside the vehicle; and
   a heating, ventilation and air conditioning (HVAC) system, including:
      an HVAC unit;
      a primary duct operably connected to the HVAC unit;
      a vent operably connected to the HVAC unit and configured to convey an airflow directly from the HVAC unit into the occupant compartment of the vehicle via the primary duct; and
      a pressure relief valve located along the primary duct upstream of the vent, the pressure relief valve configured to open when a pressure of the airflow in the primary duct exceeds a threshold, to divert a portion of the airflow through the pressure relief valve.

15. The vehicle of claim 14, further comprising:
- a secondary duct operably connected to the pressure relief valve to convey the portion of the airflow from the pressure relief valve; and
- a secondary outlet of the secondary duct through which the portion of the airflow is conveyed.

16. The vehicle of claim 15, wherein the secondary outlet directs the portion of the airflow into the occupant compartment.

17. The vehicle of claim 16, wherein the secondary outlet is in an instrument panel of the vehicle.

18. The vehicle of claim 14, wherein the pressure relief valve includes a valve opening and a valve door extending across the valve opening when the pressure relief valve is in a closed position.

19. The vehicle of claim 18, further comprising a biasing member connected to the valve door to bias the valve door in the closed position.

20. The vehicle of claim 14, wherein the pressure relief valve includes:
- a valve housing having a valve opening; and
- a flexible valve membrane secured to the valve housing;
- wherein the valve membrane covers the valve opening when the pressure relief valve is in a closed position, and the flexible membrane uncovers the valve opening when the pressure of the airflow in the primary duct exceeds the threshold.

\* \* \* \* \*